United States Patent [19]
Van Kooten

[11] Patent Number: 5,642,845
[45] Date of Patent: Jul. 1, 1997

[54] TOOL BOX LOCKING DEVICE

[76] Inventor: Micheal Van Kooten, 15 Lawrence Street, Brantford, Ontario, Canada, N3R 1A8

[21] Appl. No.: 596,739

[22] Filed: Feb. 5, 1996

[51] Int. Cl.$^6$ .............................. B60R 7/00; B60R 9/00; B60R 11/00
[52] U.S. Cl. .......................... 224/404; 224/403; 224/495; 224/42.32; 224/539; 224/558
[58] Field of Search ...................... 224/404, 403, 224/410, 448, 456, 495, 515, 331, 42.32, 539, 541, 543, 558; D12/423; 312/902; 296/37.6; 49/394; 292/202

[56] References Cited

U.S. PATENT DOCUMENTS

| | | | |
|---|---|---|---|
| 4,934,572 | 6/1990 | Bowman et al. | 224/558 |
| 5,037,019 | 8/1991 | Sokn | 224/403 |
| 5,255,832 | 10/1993 | Christensen | 224/404 |

*Primary Examiner*—Henry J. Recla
*Assistant Examiner*—Timothy L. Maust

[57] ABSTRACT

A tool box locking device includes a base plate secured to opposing side walls in an interior of a tool box. The base plate has a pair of slots formed therethrough on opposing sides thereof. A pivot shaft is secured to the base plate between the pair of slots formed therethrough. The pivot shaft has end portions extending over the pair of slots through the base. A U-shaped handle has free ends thereof pivotally coupled with the end porions of the pivot shaft. A U-shaped locking bar is positionable at an exterior of the tool box with free ends thereof extending inwardly of the tool box through the slots thereof and through the slots of the base plate to be pivotally coupled with the free ends of the U-shaped handle. A locking mechanism is included for selectively locking of the U-shaped handle.

4 Claims, 3 Drawing Sheets

TOOL BOX LOCKING DEVICE

BACKGROUND OF THE INVENTION

1. Field of the Invention

The present invention relates to a tool box locking device and more particularly pertains to engaging rails of a truck bed for securing a tool box thereto with a tool box locking device.

2. Description of the Prior Art

The use of tool box mounts is known in the prior art. More specifically, tool box mounts heretofore devised and utilized for the purpose of supporting a tool box in a truck bed are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,121,306 to Palmisano discloses a tool compartment.

U.S. Pat. No. 4,085,961 to Brown discloses a tool box mount for pickup truck.

U.S. Pat. No. Des. 275,275 to Stapp discloses the ornamental design for a roller suspended tool box for pickup trucks or the like.

U.S. Pat. No. 5,316,358 to Payne et al. discloses an integral storage container for pick-up truck.

U.S. Pat. No. 4,850,519 to Farmer, Jr. discloses an assemblable tool box for a pickup truck.

While these devices fulfill their respective, particular objective and requirements, the aforementioned patents do not describe a tool box locking device for engaging rails of a truck bed for securing a tool box thereto.

In this respect, the tool box locking device according to the present invention substantially departs from the conventional concepts and designs of the prior art, and in doing so provides an apparatus primarily developed for the purpose of engaging rails of a truck bed for securing a tool box thereto.

Therefore, it can be appreciated that there exists a continuing need for new and improved tool box locking device which can be used for engaging rails of a truck bed for securing a tool box thereto. In this regard, the present invention substantially fulfills this need.

SUMMARY OF THE INVENTION

In the view of the foregoing disadvantages inherent in the known types of tool box mounts now present in the prior art, the present invention provides an improved tool box locking device. As such, the general purpose of the present invention, which will be described subsequently in greater detail, is to provide a new and improved tool box locking device and method which has all the advantages of the prior art and none of the disadvantages.

To attain this, the present invention essentially comprises a base plate which can be secured to each of opposing side walls in an interior of a tool box. The base plate has a pair of slots formed therethrough on opposing sides thereof. A pivot shaft is secured to the base plate between the pair of slots formed therethrough. The pivot shaft has end portions extending over the pair of slots through the base. The device includes a U-shaped handle having a handle portion and a pair of securement arms. Each of the pair of securement arms have free ends thereof pivotally coupled with the end porions of the pivot shaft. The device includes a U-shaped locking bar having a locking support bar and a pair of securement shafts. The U-shaped locking bar is positionable at an exterior of the tool box with free ends of the pair of securement shafts extending inwardly of the tool box through the slots thereof and through the slots of the base plate to be pivotally coupled with the free ends of the pair of securement arms of the U-shaped handle. The locking bar has a rubber pad disposed on an upper surface thereof. The device includes a locking mechanism comprised of a pair of parallel support brackets secured to the base plate. Each of the support brackets has upturned end portions. The locking mechanism has a locking plate having an elongated recess formed therethrough. The locking plate is positioned between the upturned end portions of the pair of parallel support brackets. The locking plate has a handle receiving end portion dimensioned for coupling over the handle portion of the U-shaped handle. The locking mechanism has a threaded shaft extending through the base plate and extending through the elongated recess of the locking plate. A wing nut is adjustably received on the threaded shaft for selectively locking of the locking plate over the handle portion of the U-shaped handle.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved tool box locking device which has all the advantages of the prior art tool box mounts and none of the disadvantages.

It is another object of the present invention to provide a new and improved tool box locking device which may be easily and efficiently manufactured and marketed.

It is a further object of the present invention to provide a new and improved tool box locking device which is of durable and reliable construction.

An even further object of the present invention is to provide a new and improved tool box locking device which is susceptible of a low cost of manufacture with regard to both materials and labor, and which accordingly is then susceptible of low prices of sale to the consuming public, thereby making such a tool box locking device economically available to the buying public.

Still yet another object of the present invention is to provide a new and improved tool box locking device which provides in the apparatuses and methods of the prior art some of the advantages thereof, while simultaneously overcoming some of the disadvantages normally associated therewith.

Even still another object of the present invention is to provide a new and improved tool box locking device for engaging rails of a truck bed for securing a tool box thereto.

Lastly, it is an object of the present invention to provide a new and improved tool box locking device includes a base plate secured to opposing side walls in an interior of a tool box. The base plate has a pair of slots formed therethrough on opposing sides thereof. A pivot shaft is secured to the base plate between the pair of slots formed therethrough. The pivot shaft has end portions extending over the pair of slots through the base. A U-shaped handle has free ends thereof pivotally coupled with the end potions of the pivot shaft. A U-shaped locking bar is positionable at an exterior of the tool box with free ends thereof extending inwardly of the tool box through the slots thereof and through the slots of the base plate to be pivotally coupled with the free ends of the U-shaped handle. A locking mechanism is included for selectively locking of the U-shaped handle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
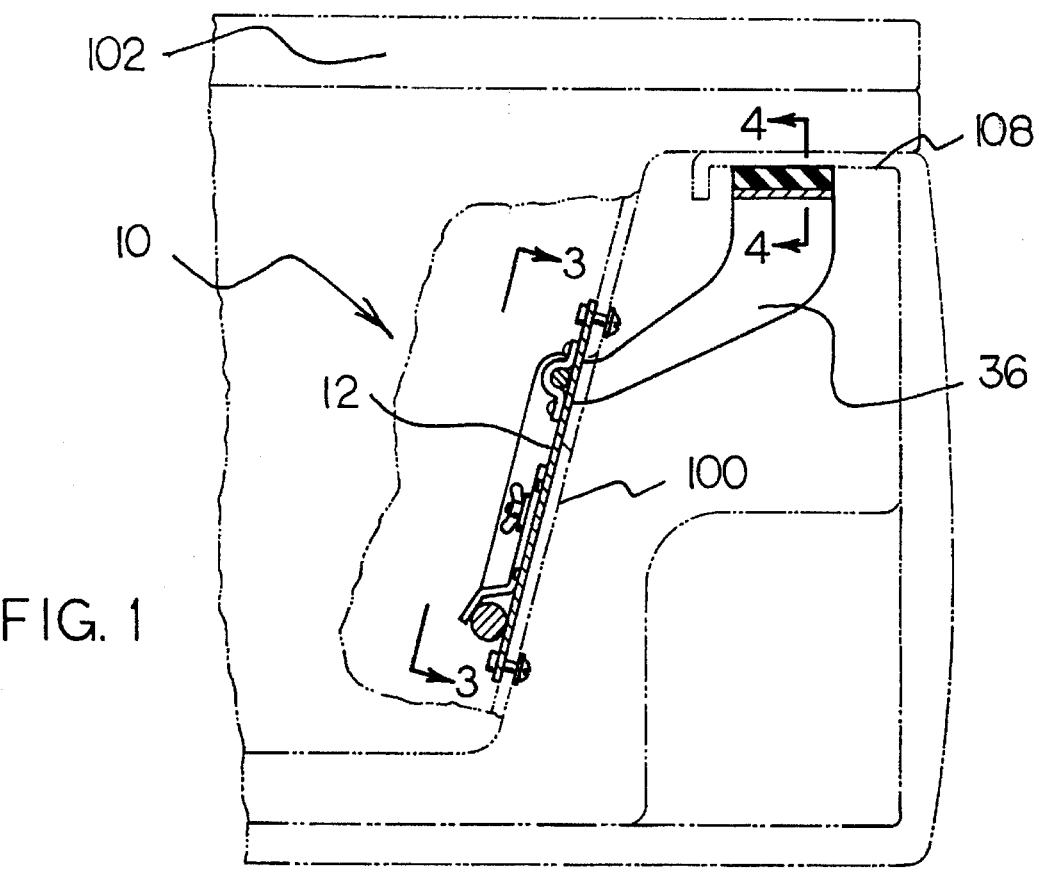
FIG. 1 is a perspective view of the preferred embodiment of the tool box locking device constructed in accordance with the principles of the present invention.
Figure 2:
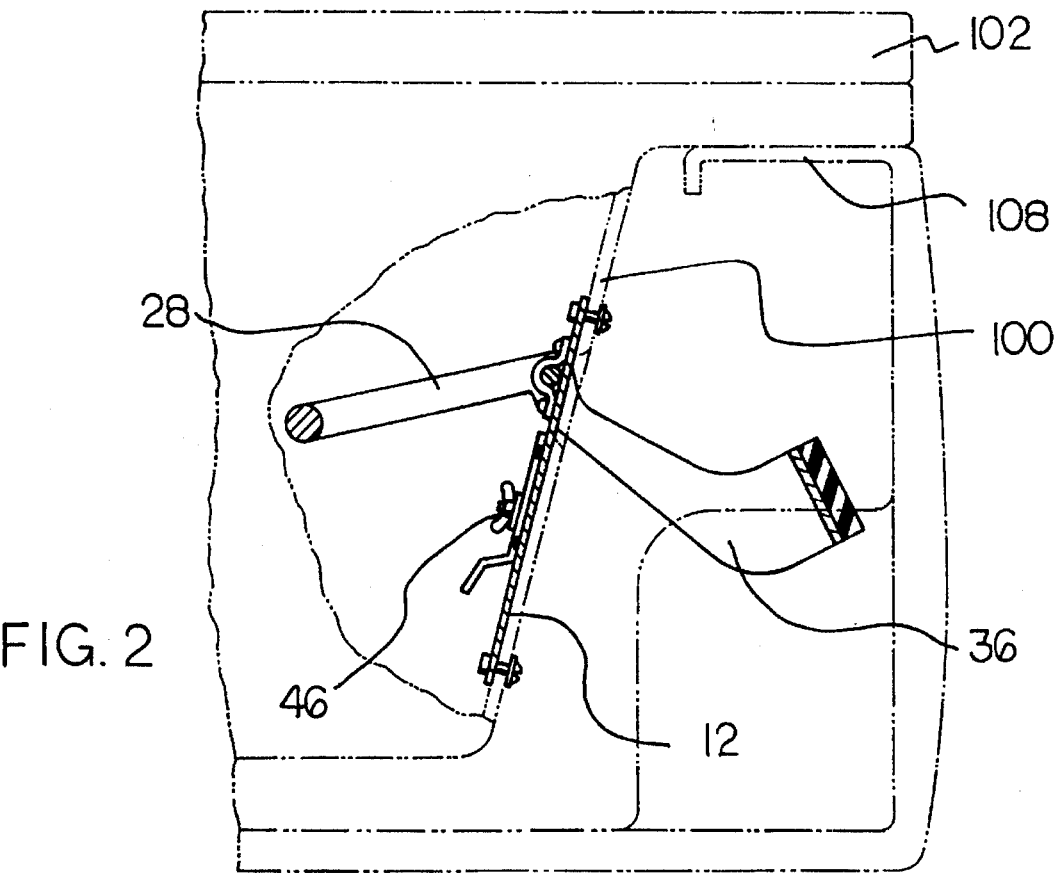
FIG. 2 is a side view of the present invention in an unlocked configuration.
Figure 3:
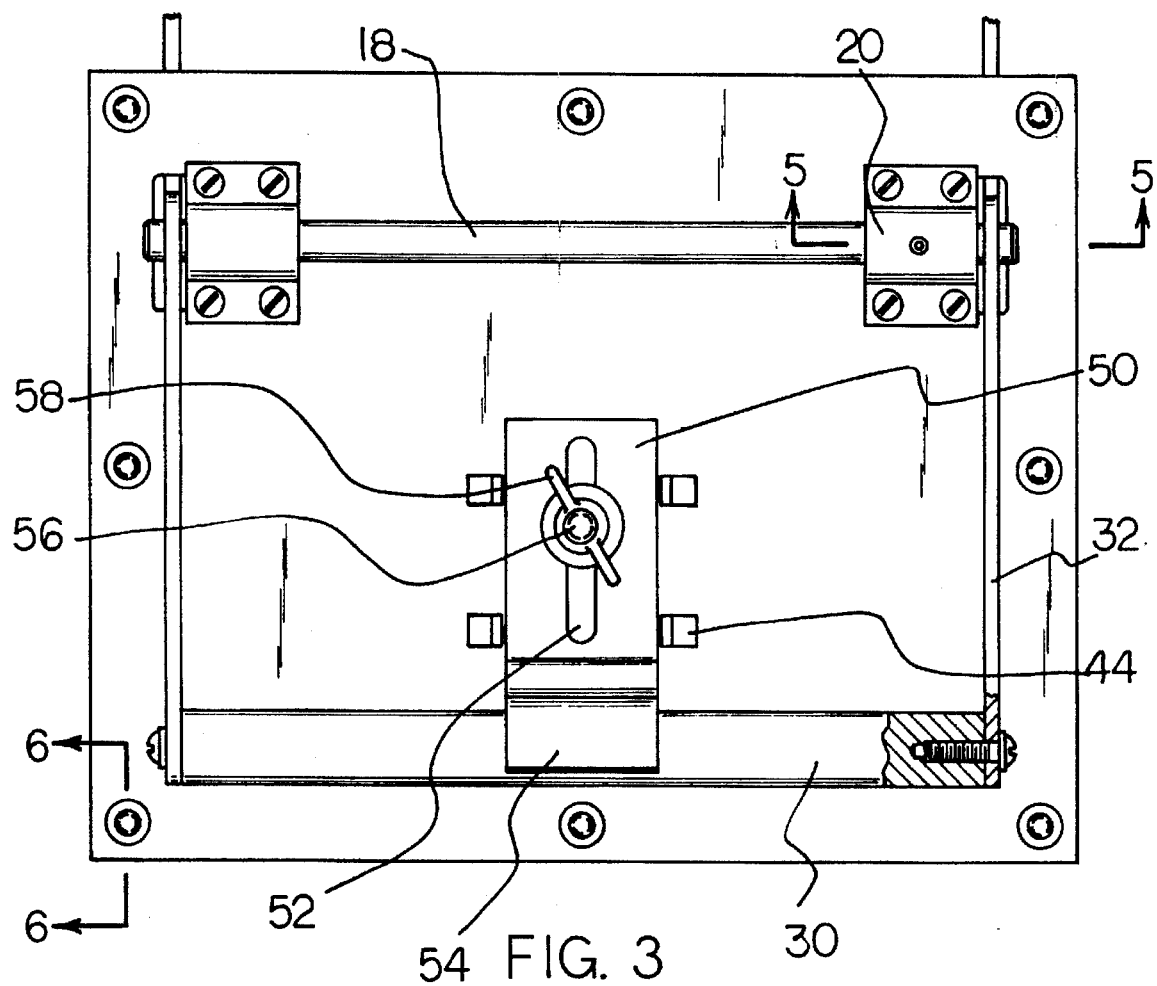
FIG. 3 is a cross-sectional view as taken along line 3—3 of FIG. 1.
Figure 4:
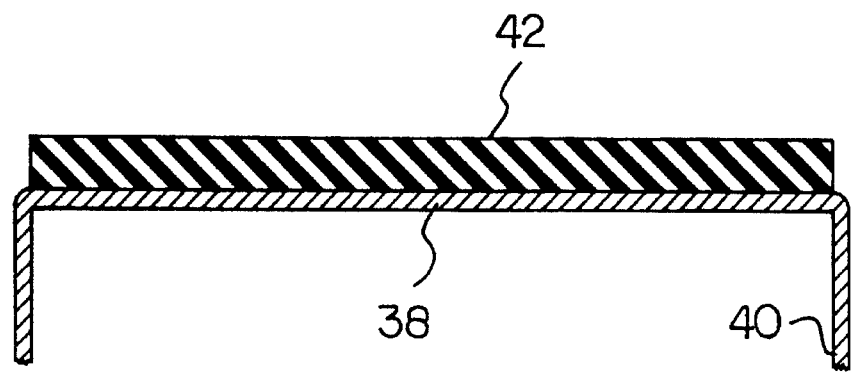
FIG. 4 is a cross-sectional view as taken along line 4—4 of FIG. 1.
Figure 5:
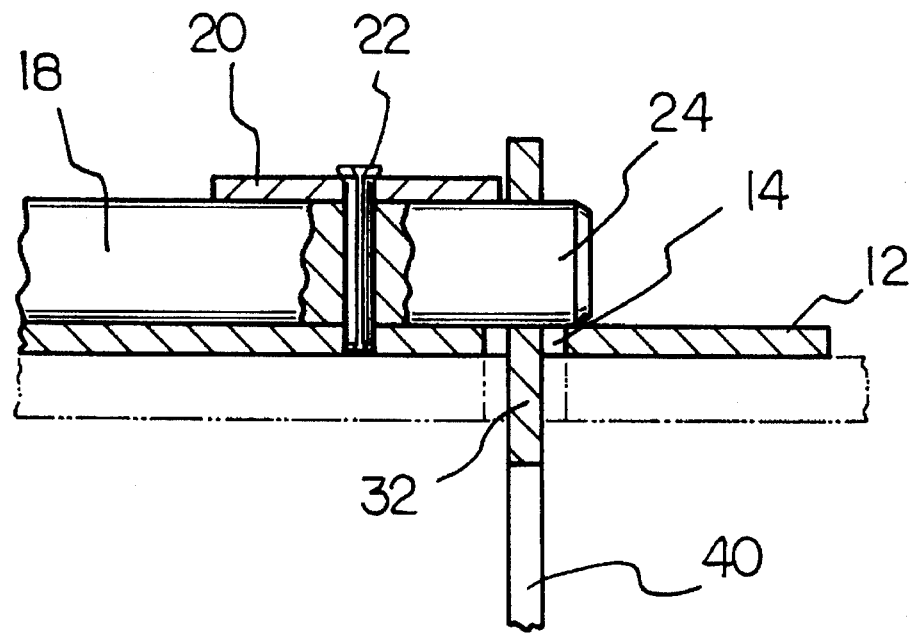
FIG. 5 is a cross-sectional view as taken along line 5—5 of FIG. 3.
Figure 6:
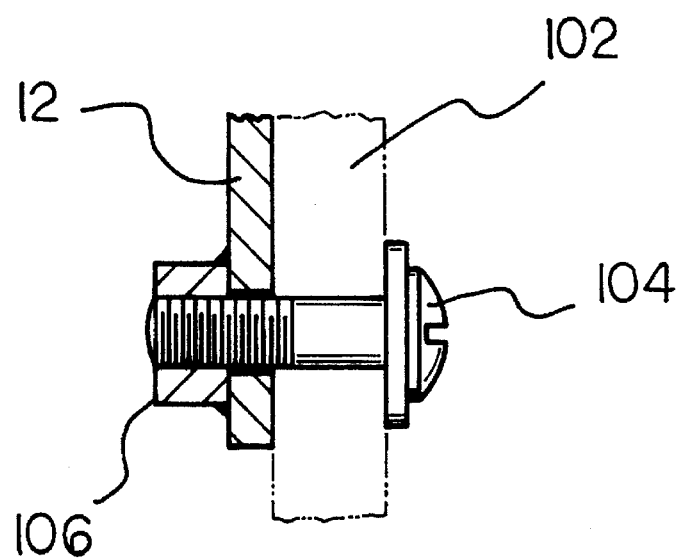
FIG. 6 is a cross-sectional view as taken along line 6—6 of FIG. 3.

With reference now to the drawings, and in particular, to FIGS. 1–6 thereof, the preferred embodiment of the new and improved tool box locking device embodying the principles and concepts of the present invention and generally designated by the reference number 10 will be described.

Specifically, it will be noted in the various Figures that the device relates to a new and improved tool box locking device for engaging rails of a truck bed for securing a tool box thereto. In its broadest context, the device consists of a base plate, a pivot shaft, a U-shaped handle, a U-shaped locking bar, and a locking mechanism. Such components are individually configured and correlated with respect to each other so as to attain the desired objective.

The device 10 includes a base plate 12 which can be secured to each of opposing side walls 100 in an interior of a tool box 102. The base plate 12 has a pair of slots 14 formed therethrough on opposing sides thereof. The base plate 12 is generally rectangular in configuration. The base plate is preferably constructed of a rigid plastic material. The base plate 12 is secured to the tool box 102 by nuts 104 and bolts 106 around the periphery of the base plate 12.

A pivot shaft 18 is secured to the base plate 12 between the pair of slots 14 formed therethrough. The pivot shaft 18 is secured to the base plate 12 by a pair of brackets 20. One of the brackets 20 has a spring pin 22 extending through the bracket 20 and through the pivot shaft 18 to prevent the rotation of the pivot shaft 18. The pivot shaft 18 has end portions 24 extending over the pair of slots 14 through the base 12.

Next, the device 10 includes a U-shaped handle 28 having a handle portion 30 and a pair of securement arms 32. Each of the pair of securement arms 32 have free ends thereof pivotally coupled with the end portions 24 of the pivot shaft 18. The U-shaped handle 28 can be raised to a position perpendicular to the base plate 12 and lowered to a position abutting the base plate 12.

The device 10 further includes a U-shaped locking bar 36 having a locking support bar 38 and a pair of securement shafts 40. The U-shaped locking bar 36 is positionable at an exterior of the tool box 102 with free ends of the pair of securement shafts 40 extending inwardly of the tool box 102 through the slots thereof and through the slots 14 of the base plate 12 to be pivotally coupled with the free ends of the pair of securement arms 32 of the U-shaped handle 28. The locking bar 38 has a rubber pad 42 disposed on an upper surface thereof. The U-shaped locking bar 36 operates in a cantilever arrangement whereby pressing the U-shaped handle 28 down against the base plate 12 will cause the U-shaped locking bar 36 to raise upwardly to engage an underside of an inner bed wall 108 of a truck bed to secure the tool box 102 in place. The lifting of the U-shaped handle 28 will cause the U-shaped locking bar 36 to lower thereby disengaging the underside of the inner bed wall 108 of the truck bed to allow for the removal of the tool box 102. The rubber pad 42 protects the underside of the inner bed wall 108 from being scratched by the locking bar 38.

The device 10 includes a locking mechanism 46 comprised of a pair of parallel support brackets 48 secured to the base plate 12. Each of the support brackets 48 has upturned end portions. The locking mechanism 46 has a locking plate 50 having an elongated recess 52 formed therethrough. The locking plate 50 is positioned between the upturned end portions of the pair of parallel support brackets 48. The locking plate 50 has a handle receiving end portion 54 dimensioned for coupling over the handle portion 30 of the U-shaped handle 28. The locking mechanism 46 has a threaded shaft 56 extending through the base plate 12 and extending through the elongated recess 52 of the locking plate 50. A wing nut 58 is adjustably received on the threaded shaft 56 for selectively locking of the locking plate 50 over the handle portion 30 of the U-shaped handle 28. Locking of the U-shaped handle 28 requires the handle portion 30 to be pressed down against the base plate 12. The handle receiving end portion 54 is then positioned over the handle portion 30 and the wing nut 58 is tightened to preclude movement of the locking plate 50 and the U-shaped handle 28. Loosening of the wing nut 58 allows the locking plate 50 to slide upwardly via the elongated recess 52 to disengage the handle portion 30 from the locking plate 50 to be able to lift the U-shaped handle 28 to disengage the U-shaped locking bar 36 from the underside of the inner bed wall 108 of the truck bed.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A tool box locking device for a tool box having end portions adapted to rest on side rails of a truck bed, said locking device adapted to secure said rails between said end portions of said tool box and said locking device, said locking device comprising, in combination:

a base plate adapted to be secured to opposing side walls in an interior of a tool box, the base plate having a pair of slots formed therethrough on opposing sides thereof;

a pivot shaft secured to the base plate between the pair of slots formed therethrough, the pivot shaft having end portions extending over the pair of slots through the base plate;

a U-shaped handle having a handle portion and a pair of securement arms, each of the pair of securement arms having free ends thereof pivotally coupled with the end porions of the pivot shaft;

a U-shaped locking bar having a locking support bar and a pair of securement shafts, the U-shaped locking bar adapted to be positionable at an exterior of the tool box with free ends of the pair of securement shafts extending inwardly of the tool box through slots therein and through the slots of the base plate and pivotally coupled with the free ends of the pair of securement arms of the U-shaped handle, the locking bar having a rubber pad disposed on an upper surface thereof and being pivotable into engagement with said rail thereby securing said rail between said end portions and said locking device;

a locking mechanism comprised of a pair of parallel support brackets secured to the base plate, each of the support brackets having upturned end portions, the locking mechanism having a locking plate having an elongated recess formed therethrough, the locking plate positioned between the upturned end portions of the pair of parallel support brackets, the locking plate having a handle receiving end portion dimensioned for coupling over the handle portion of the U-shaped handle, the locking mechanism having a threaded shaft extending through the base plate and extending through the elongated recess of the locking plate, a wing nut being adjustably received on the threaded shaft for selectively locking of the locking plate over the handle portion of the U-shaped handle.

2. A tool box locking device for a tool box having end portions adapted to rest on side rails of a truck bed, said locking device adapted to secure said rails between said end portions of said tool box and said locking device, said locking device comprising:

a base plate adapted to be secured to opposing side walls in an interior of a tool box, the base plate having a pair of slots formed therethrough on opposing sides thereof;

a pivot shaft secured to the base plate between the pair of slots formed therethrough, the pivot shaft having end portions extending over the pair of slots through the base plate;

a U-shaped handle having free ends thereof pivotally coupled with the end porions of the pivot shaft;

a U-shaped locking bar adapted to be positionable at an exterior of the tool box with free ends thereof extending inwardly of the tool box through slots therein and through the slots of the base plate and pivotally coupled with the free ends of the U-shaped handle said locking bar being pivotable into engagement with said rail thereby securing said rail between said end portions and said locking device;

a locking mechanism for selectively locking of the U-shaped handle.

3. The device as set forth in claim 2 wherein the locking mechanism further including a pair of parallel support brackets secured to the base plate, each of the support brackets having upturned end portions, the locking mechanism having a locking plate having an elongated recess formed therethrough, the locking plate positioned between the upturned end portions of the pair of parallel support brackets, the locking plate having a handle receiving end portion dimensioned for coupling over the U-shaped handle, the locking mechanism having a threaded shaft extending through the base plate and extending through the elongated recess of the locking plate, a wing nut being adjustably received on the threaded shaft for selectively locking of the locking plate over the U-shaped handle.

4. The device as set forth in claim 2 and further including a rubber pad disposed on an upper surface of the U-shaped locking bar.

* * * * *